United States Patent
Kroon (10) Patent No.: US 6,826,153 B1
(45) Date of Patent: Nov. 30, 2004

(54) SYSTEM AND METHOD OF INCREASING THE MESSAGE THROUGHPUT IN A RADIO NETWORK

(76) Inventor: Jeffrey Kroon, 4333 Wells Curtice Rd., Canandaigua, NY (US) 14424

( * ) Notice: Subject to any disclaimer, the term of this patent is extended or adjusted under 35 U.S.C. 154(b) by 655 days.

(21) Appl. No.: 09/661,403

(22) Filed: Sep. 13, 2000

(51) Int. Cl.$^7$ .............................................. H04L 12/28
(52) U.S. Cl. ....................... 370/235; 370/349; 370/412; 370/449
(58) Field of Search ................................ 370/235, 236, 370/229, 310, 345, 349, 360, 389, 394, 395.4, 412, 415, 433, 431, 434, 449, 450; 709/230, 232, 238, 240, 247

(56) References Cited

U.S. PATENT DOCUMENTS

| | | | |
|---|---|---|---|
| 5,121,387 A | * 6/1992 | Gerhardt et al. ............. 370/322 |
| 5,131,016 A | 7/1992 | Broughton et al. |
| 5,164,938 A | 11/1992 | Jurkevich et al. |
| 5,247,516 A | 9/1993 | Bernstein et al. |
| 5,282,207 A | 1/1994 | Jurkevich et al. |
| 5,371,734 A | 12/1994 | Fischer |
| 5,502,726 A | 3/1996 | Fischer |
| 5,533,029 A | 7/1996 | Gardner |
| 5,572,528 A | 11/1996 | Shuen |
| 5,592,472 A | * 1/1997 | Grant et al. ................. 370/351 |
| 5,761,438 A | 6/1998 | Sasaki |
| 5,815,667 A | * 9/1998 | Chien et al. ................. 709/232 |
| 5,931,915 A | * 8/1999 | Benner et al. ............... 709/232 |
| 6,018,516 A | 1/2000 | Packer |
| 6,091,710 A | 7/2000 | Mawhinney |
| 6,118,765 A | 9/2000 | Phillips |
| 6,198,728 B1 | * 3/2001 | Hulyalkar et al. ........ 370/310.1 |
| 6,215,769 B1 | 4/2001 | Ghani et al. |
| 6,253,207 B1 | 6/2001 | Malek et al. |
| 6,295,553 B1 | * 9/2001 | Gilbertson et al. .......... 709/207 |
| 6,298,041 B1 | 10/2001 | Packer |
| 6,385,647 B1 | 5/2002 | Willis et al. |
| 6,430,164 B1 | * 8/2002 | Jones et al. .................. 370/313 |
| 6,473,425 B1 | 10/2002 | Bellaton et al. |
| 6,574,218 B1 | 6/2003 | Cooklev |
| 6,611,535 B2 | 8/2003 | Ljungqvist |
| 6,628,610 B1 | * 9/2003 | Waclawsky et al. ......... 370/229 |
| 2001/0024434 A1 | 9/2001 | Ayyagari et al. |

FOREIGN PATENT DOCUMENTS

WO    WO 99/22557    10/1997

OTHER PUBLICATIONS

Balakrishnan et al. "Improving TCP/IP Performance over Wireless Networks."

* cited by examiner

*Primary Examiner*—Hassan Kizou
*Assistant Examiner*—Dmitry Levitan (57) ABSTRACT

A system and method of increasing message throughput in a communications system utilizing priority management, conglomeration and compression, TCP retransmission filtering and pull transmission. The priority manages ranks the messages in a message queue as a function of the priority and time to live of each message. The conglomerator conglomerates messages into assemblies destined for the same destination radio. The TCP filter prevents the retransmission of successfully received messages. The messages are transmitted as a function of the availability of the destination radio to receive.

15 Claims, 4 Drawing Sheets

MESSAGE QUEUE 205

| MESSAGE # | PRIORITY | TTL | DEST RADIO |
|---|---|---|---|
| A | 10 | 10 | 201 |
| B | 2 | 60 | 202,203 |
| C | 2 | 90 | 205 |
| D | 7 | 90 | 202,203 |
| E | 10 | 90 | 201 |
| . | | | |
| . | | | |
| . | | | |
| Z | | | |

RADIO QUEUE 200

| RADIO # | #OF MESSAGES |
|---|---|
| 201 | 2 |
| 202 | 2 |
| 203 | 2 |
| 205 | 1 |
| . | |
| . | |
| . | |

MESSAGE QUEUE 205

| MESSAGE # | PRIORITY | TTL | DEST RADIO |
|---|---|---|---|
| A | 10 | 10 | 201 |
| B | 2 | 60 | 202,203 |
| C | 2 | 90 | 205 |
| D | 7 | 90 | 202,203 |
| E | 10 | 90 | 201 |
| . . . . Z | | | |

RADIO QUEUE 200

| RADIO # | #OF MESSAGES |
|---|---|
| 201 | 2 |
| 202 | 2 |
| 203 | 2 |
| 205 | 1 |
| . . . . | |

*FIGURE 4*

SYSTEM AND METHOD OF INCREASING THE MESSAGE THROUGHPUT IN A RADIO NETWORK

BACKGROUND OF THE INVENTION

The present invention is directed generally to conserving bandwidth and increasing the message throughput in a packet switching communications network.

In a conventional packet switching network, the data to be sent is divided into individual packets of data, involving a process of segmentation or subdivision of larger sets of data as specified by the native protocol of the transmitting device. Each packet typically includes a header, payload and trailer. The header contains the control information, such as source and destination addresses, sequence numbers, synchronizing bits and length of the packet. The payload is the data to be transmitted. The trailer generally includes error detection and correction bits.

Each packet has a unique identification number and each packet carries it own destination station address. Each packet is independent, with multiple packets in a stream of packets often traversing the network from source station to destination station by different routes. Since the packets may follow different physical paths of varying lengths, they may experience various levels of propagation delay, known as latency. As a result, the packets may arrive in a different order than they were presented to the network. The packet sequence number allows the destination station to reassemble the packet data in the proper sequence before presenting it to the ultimate destination application.

Packet switching was originally developed to support interactive communications between asynchronous computers for time-share applications allowing for varying levels of latency and yielding a high level of efficiency for digital data networking. Isochronous data such as real-time voice and video, on the other hand, are stream-oriented and highly intolerant of latency. As a result, packet switched networks were originally thought to be inappropriate for such applications. Recent developments of communications software and complex compression algorithms have increased the suitability of packet switching for such real-time applications. The most widely used public packet switching network is the Internet.

Transmission Control Protocol (TCP) and Internet Protocol (IP) are the most complete and accepted network protocols for a packet switched network. Prior to transmission of data, TCP is responsible for breaking the message into packets, sized appropriately for the network. TCP marks the packets with the sequence numbers that allows the destination station to properly reassemble the packets into the original message. TCP also verifies the accuracy of the data transmitted through the use of checksums, a simple mathematical computation applied to the data contained in the packet. The destination station does the same calculation on the received data and compares the result with the checksum sent with the packet. If the results match, the destination station sends an acknowledgment message to the source station. If the source station does not receive a TCP acknowledgment message within a predetermined period of time, the source station will re-transmit the unacknowledged packet, and this process is repeated until receipt is acknowledged, thereby ensuring successful communication. Delays in the acknowledgment message reaching the source station may cause unnecessary retransmissions of message packets which have been previously successfully transmitted.

IP is the messenger protocol which basically addresses and sends the packets. IP attempts to deliver every packet but has no provision for retransmitting lost or damaged packets. IP leaves such error correction, if required, to higher level protocols, such as TCP.

Together, TCP/IP is the most accepted networking protocol. Virtually all modern operating systems offer TCP/IP support, and most large networks rely on TCP/IP for all their network traffic.

While designed initially for wired networks, TCP/IP has now been recognized as the desired protocol for wireless networks as well. However, the wireless environment presents additional concerns such as reduced bandwidth, higher operating costs associated with radio transmissions, and the half-duplex nature of some wireless systems. As a result, conventional methods of message management that have been utilized for wired networks may not be sufficient for wireless circuits.

For example, conglomeration methods have been used in wired systems to conserve bandwidth. These conventional techniques have been applied to wireless systems as well. In a wireless system, each station has at least one associated radio for transmitting message packets from station to station. A conventional conglomeration method is to transmit all packets addressed to the same destination station as a single conglomerated assembly. The destination station will then unconglomerate the packets and reassemble the message using conventional TCP methods. However, by conglomerating message packets as a function of the ultimate destination station, multiple transmissions may be required to a radio which is shared by multiple destination stations. Thus, conventional conglomeration methods do not take advantage of the fact that some destination stations utilize a common radio and would permit a higher level of conglomeration and increased message throughput.

Compression of messages prior to transmission is another common way to conserve the available bandwidth, and thus transmission time and capacity. Typically, all message packets are compressed prior to transmission to reduce the size of each message packet. However, compression of a packet may not result in a smaller message packet. Some message packets, due to the nature of the data contained, i.e.,some JPEG and video files, are not well suited for compression and will actually become larger after compression. Thus, compression of all packets may result in increasing the bandwidth required for some messages.

Further, in a conventional wireless TCP/IP environment, the radios are not capable of identifying an acknowledgment message received from a destination station. For example, a source station sends a retransmit message to its associated radio for retransmission if it does not receive an acknowledgment message from the destination station in a predetermined period of time. Even if the radio receives an acknowledgment of the successfully transmitted packet, the radio will unnecessarily retransmit the packet due to the inability of the radio to identify the acknowledgment message. Additionally, once the TCP retransmit message has been sent from the source station to the source radio, there is no mechanism to prevent the radio from retransmitting the packet should the source station receive the acknowledgment message later than anticipated but prior to retransmission by the source radio.

In a conventional communication network, messages are generally transmitted as a function of the priority of the message. Generally, high priority messages are transmitted before lower priority messages; the goal being to maximize the number of messages sent in order of priority. As a result, lower priority messages may "expire" or exceed their "time to live" prior to transmission so that higher priority messages can be sent, causing a loss of communication.

A communications network which transmits solely as a function of the priority of the messages (a "push" transmission method) results in excessive "idle" time for the network and reduces the message throughput in the system. In a "push" communication system, once a high priority message is selected, the source radio will transmit the selected message prior to selecting the next highest priority message for transmission. If the destination radio for the selected message is unable to receive, the source radio will wait idly for the destination radio to become available. This idle time reduces the message throughput of the system and contributes to the expiration of lower priority messages prior to transmission.

In some communication systems, the idle time may prevent consideration of higher priority messages that may be have been received while waiting for a destination station to become available. Other communication systems will abort the transmission of a message if a higher priority message is received from the source station for transmission, adding further time delays and thus decreasing the message throughput.

The present invention is directed to solving some of the previously identified problems by increasing the message throughput or capacity of a system while conserving bandwidth and transmission time. In one aspect, applicant's priority manager considers not only the priority of the messages to be transmitted, but also the time to live of each message, whether the message is voice or data, and the availability of the destination radio to receive.

In another aspect, applicant's conglomeration manager conglomerates packets destined to the same destination radio, without regard to the message's destination station thereby increasing the percentage of conglomeration.

In a further aspect, the conglomeration manager also considers whether compression will reduce or increase the size of the conglomerated assembly, and will bypass the compression algorithm if sufficient reduction in bandwidth is not achieved.

In yet another aspect, applicant's TCP filter reduces unnecessary retransmissions by reducing the delays associated with the recognition of an acknowledged packet.

Accordingly, it is an object of the present invention to provide a novel method and system of conglomerating message packets in a radio network thereby increasing the message throughput the network.

It is another object of the present invention to provide a novel method and system of transmitting message packets as a function of the availability of the destination radio.

It is yet another objective of the present invention to provide a novel method and system for prioritizing the transmission of messages as a function of the urgency of the message packets.

It is still another object of the present invention to provide a novel system and method of providing voice messages with priority over data messages.

It is yet still another object of the present invention to conserve bandwidth by selectively compressing message packets prior to transmission.

It is still another object of the present invention to provide a novel system and method of reducing transmissions in a TCP/IP environment.

These and many other objects and advantages of the present invention will be readily apparent to one skilled in the art to which the invention pertains from a perusal of the claims, the appended drawings, and the following detailed description of the preferred embodiments.

DESCRIPTION OF THE PREFERRED EMBODIMENTS

System Overview

Figure 1:
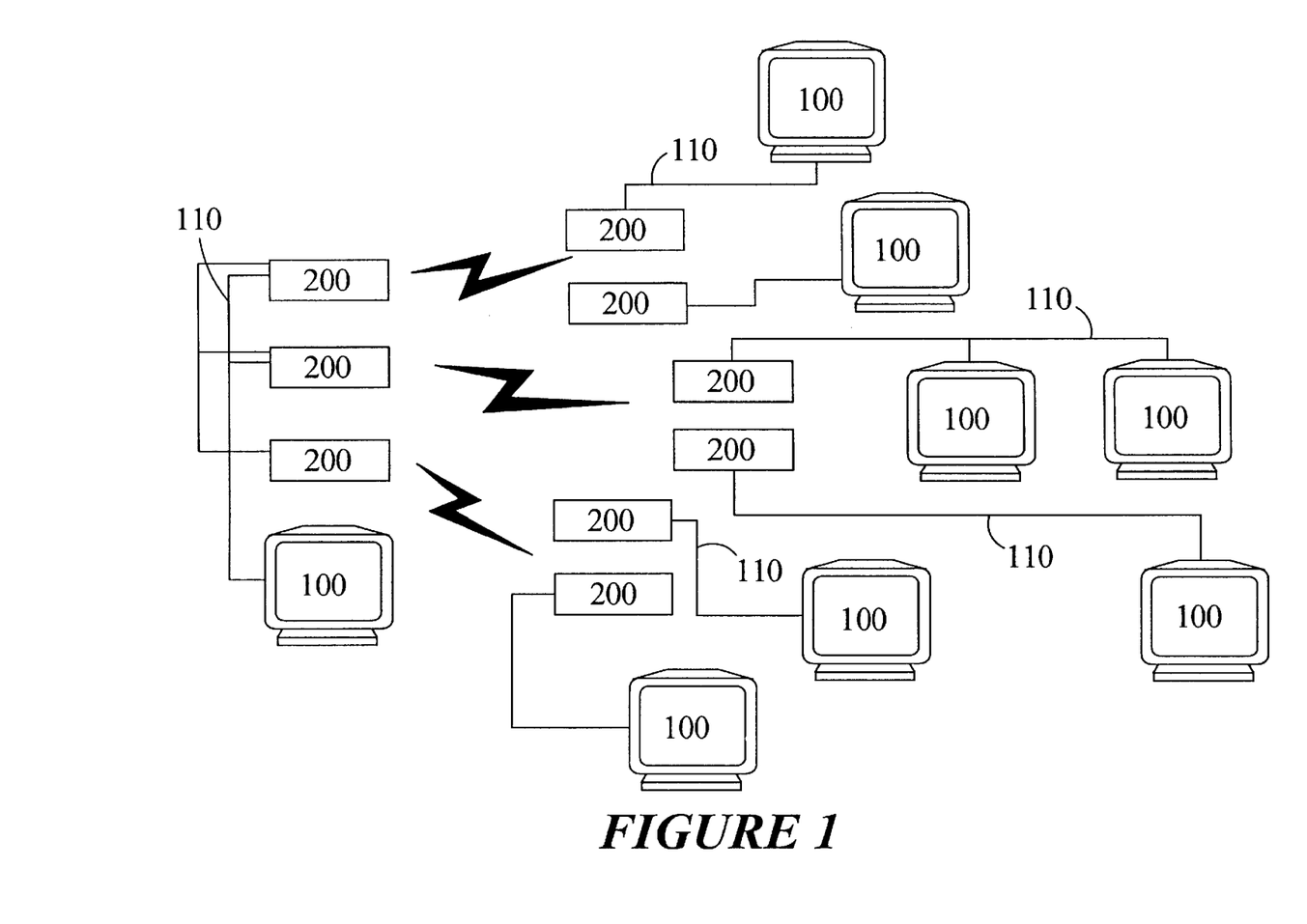
FIG. 1 is a high level schematic representation of the elements of a telecommunications system in which the present invention may be utilized.

FIG. 1 illustrates a conventional communication network for transmitting message packets according to the methods of the present invention. The radios 200 of the type illustrated in FIG. 1 operate as mini LANS over the wireless media. The radios 200 can comprise a plurality of subnets and are capable of transmitting and receiving data and voice. Each of the radios of the subnet are connected via an Ethernet link 110 to stations 100 for managing the data. A plurality of radios 200 may also be connected via an Ethernet link 110 and may be connected to a router that provides access to stations 100 and a fixed network backbone.

Figure 2:
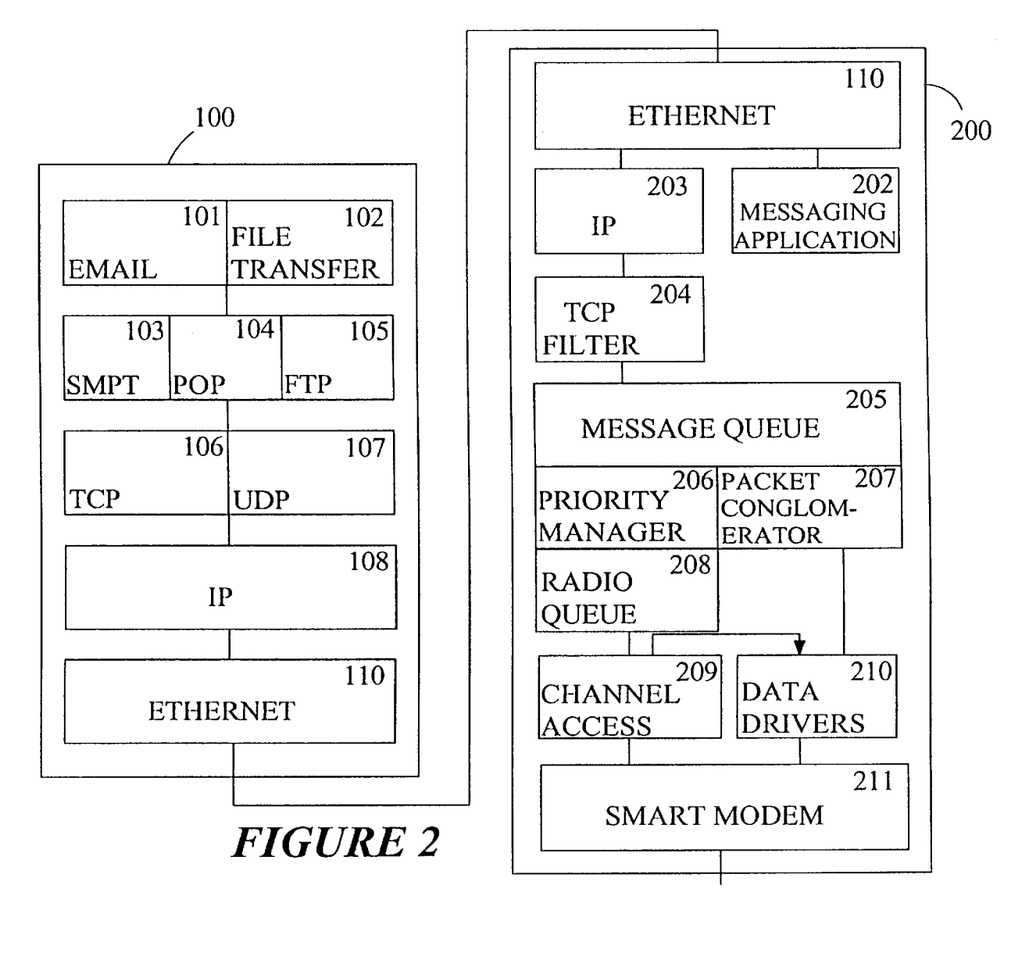
FIG. 2 is a high level schematic representation of the elements of a station and a radio of FIG. 1.

The communication system of FIG. 1 may employ industry standard protocols, such as Internet Protocol (IP) or User Datagram Protocol (UDP) for communicating between radios and stations The radios 200 may include packet data radios of the software programmable or software defined type including the type illustrated in FIGS. 1 and 2 of U.S. patent application Ser. No. 09/184,709, filed Nov. 3, 1998, commonly owned with the present application, and incorporated herein by reference. All interface software may be resident in the radios 200 except for the software used to configure the radios. Each of the radios can be configured by downloading software to define and configure operating parameters, such as subnet membership and subnet parameters. Subnet membership creates a subnet, names radios, allocates named radios to the subnet and provides a unique radio network address or subnet address for each radio. The subnet parameters configure the operating parameters of each subnet.

With reference to FIG. 2, a station 100 in the network of FIG. 1 may be an off the shelf personal computer, laptop or other device capable of executing standard communications files and protocols including Electronic Mail (e-mail) 101, File Transfer 102, Simple Mail Transfer File (SMTF) 103, Post Office Protocol (POP) 104, File transfer Protocol (FTP) 105, Transmission Control Protocol (TCP) 106, User Datagram Protocol (UDP) 107, and Internet Protocol (IP) 108.

A Station 100 may be coupled to a radio 200 in the network of FIG. 1 via an Ethernet connection 110 to communicate with the radio 200 via the IP circuit 203. The IP circuit 203 routes the message packets to the TCP filter 204. The TCP filter 204 compares the received message with the messages in the message queue 205 and discards the received message if it is a duplicate of a message stored in the queue. Message packets from the TCP filter 204 are stored in message queue 205.

Messaging applications 202, such as Global Positioning Satellite (GPS) messaging and gateway messaging may also be applied to the message queue 205.

The radio queue maintains a list of the destination radios associated with the messages in the message queue. The priority manager 206 is responsible for ranking the order of the message packets in the message queue 205, maintaining a database of the availability status of all radios in the network or subnet, ranking the order of the destination radio addresses in the radio queue 208, and selecting an available destination radio for transmission.

Packet conglomerator 207 conglomerates individual message packets destined for the same destination radio into a conglomerated assembly. Packet conglomerator 207 may then compress and encrypt the conglomerated assembly.

The selected destination station for transmission is passed from priority manager 206 to channel access 209. Channel access module 209 may utilize various conventional methods to provide radio 200 with a transmission channel.

The present invention may utilize the channel access protocol described in pending U.S. patent application Ser. No. 09/398,019, commonly owned and having an inventor in common with the present application, the disclosure of which is incorporated herein by reference. The channel access addresses the data drivers 210 and the smart modem 211. The conglomerated assembly is then sent to data drivers 210 and the smart modem 211 for transmission to the selected destination radios.

Figure 3:
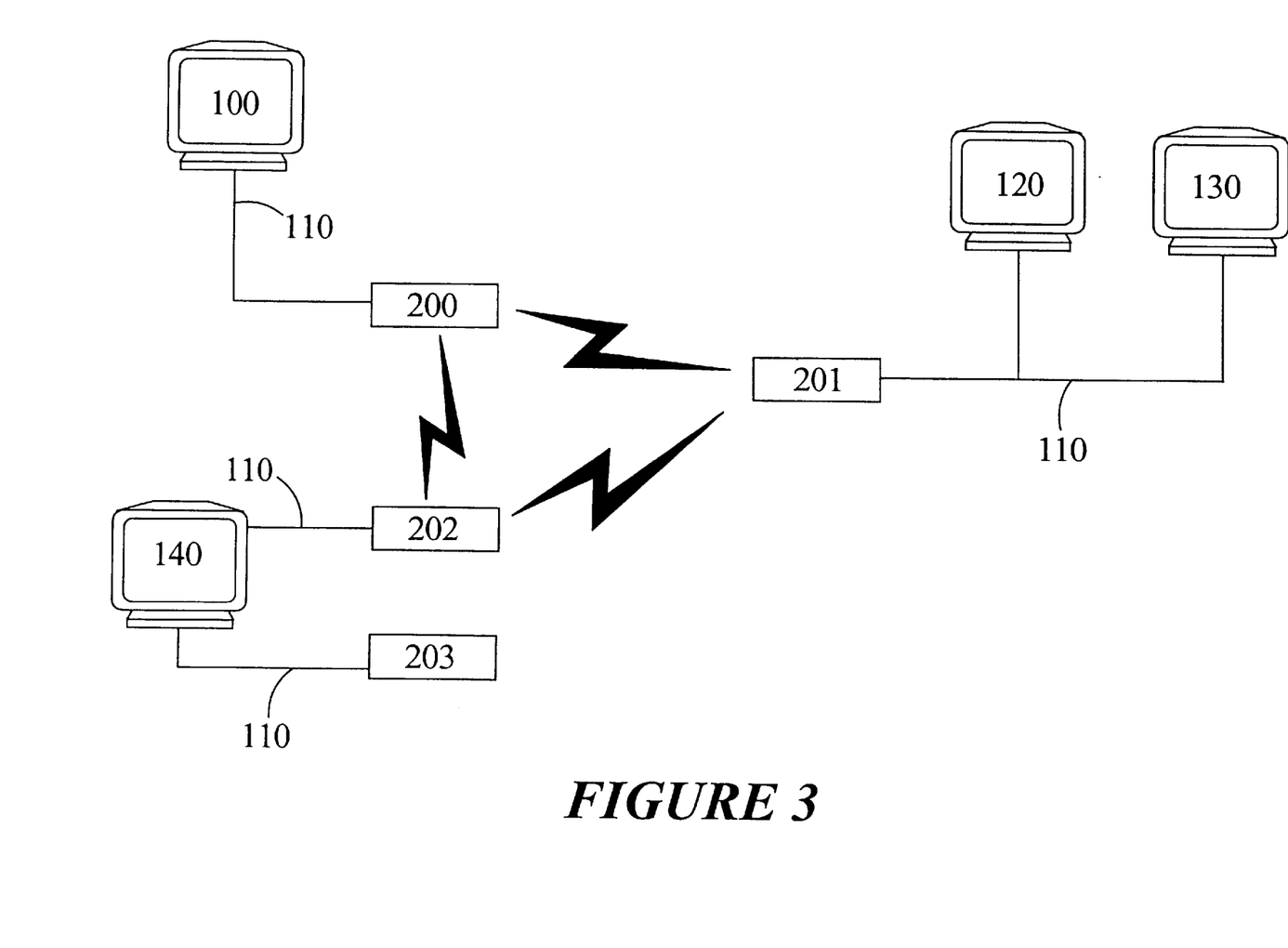
FIG. 3 is a high level schematic representation of the elements of a telecommunications system in which the present invention may be utilized.

With reference to FIG. 3, a station 100 in the network of FIG. 1 may be connected to one or more radios 200 through the Ethernet and a radio may be connected to one or more stations through the Ethernet. For example, a radio 201 may be connected to two stations 120 and 130 through Ethernet connection 110. Each radio and each station may be assigned a unique address for the purpose of transmitting message packets within the communication network.

In one embodiment of the present invention, conventional IP subset masking is used to route the data packets in the system. A station may be assigned a unique IP address, while individual applications within a station may be assigned an associated IP port. Likewise, a radio may be assigned an IP address or may be identified by a unique physical address (Subnet 2, Radio 3). For example, the lowest three IP address characters of the destination station may be used for the unique radio network address or radio subnet address of the destination radio.

In operation, a station can send a message packet to any other station through its associated radio. For example, if the communication network of FIG. 3 is operating using TCP as the reliable transport protocol, a source station 100 may send a TCP/IP message packet for transmission to a destination station 120 through the source station's associated source radio 200. The source radio 200 will transmit the message packet to the destination radio 201 associated with the destination station 120. Upon receipt of the message packet, the destination radio 201 will transfer the message packet to the destination station 120 through the Ethernet connection 110 or such other conventional means. Once the destination station 120 receives the message packet, it will send a TCP/IP acknowledgment message to the destination radio 201 for transmission to the source station 100 through the associated source radio 200. If the source station 100 does not receive the TCP acknowledgment within some predetermined period of time, the source station 100 will send a TCP retransmit message to the source radio 200 for retransmission of the message packet to the destination station 120.

As discussed more fully below, the communication system architecture of the present invention is designed to maximize capacity with packet conglomeration, compression, TCP message filtering and message prioritizing techniques. Additionally, the architecture reduces the costs associated with unnecessary keying of the radios and minimizes the electronic footprint by reducing the number and length of transmissions required to transmit the IP packets.

Operation of the System

The present invention utilizes a number of unique methods to increase the message throughput of the communications system while at the same time reducing the number of transmissions required to deliver the same number of message packets in a conventional communications system. The message throughput is increased through the use of a novel priority manager which maximizes the delivery of messages within their time to live and reduces the idle time waiting for an available destination radio. The number of transmissions is reduced through a novel message conglomerator and through the use of a novel TCP filter which eliminates unnecessary retransmissions.

The systems and methods disclosed herein are applicable to both free space communications, i.e., radio, microwave, satellite, wireless LANs, cellular and optical, as well as wired communications, although the advantages of the applicant's invention may be more beneficial to wireless applications where conserving bandwidth is of significant concern.

Priority Management

With reference to FIG. 2, the priority manager 206 maximizes the number of message packets delivered prior to expiration by ranking the messages in the message queue as a function of the message's time to live, and by transmitting messages as a function of the availability of the destination radios to receive.

Each message packet has associated with it a time to live and a priority (typically assigned by the originator of the message) as well as a reference time stamp corresponding to the receipt of the message in the message queue 205.

The priority manager 206 assigns an urgency to each message as a function of the time to live and priority of the message, taking into account the reference time and the current time. The message packets are then ranked in the message queue as a function of urgency, with the most urgent message ranked highest.

Each message packet in the message queue 205 is addressed to a destination station, and each destination station has one or more destination radios to receive the transmitted message. The priority manager maintains a radio queue 208 of the addresses of the destination radios associated with the message packets in the message queue 205. The list of radio addresses in the radio queue 205 are ranked as a function of the urgency of the message packets destined for each radio, with the highest ranked radio corresponding to the most urgent message.

One embodiment of the present invention utilizes a "pull" rather than a "push" transmission method to maximize the throughput of the message packets transmitted in the network, i.e., a source radio transmits message packets as a function of the availability of the destination radio of the message packets. If a destination radio of the highest ranked message packet is not available, the next highest ranked available destination radio is selected and its corresponding message packets are transmitted. Thus, the transmitted message packets may be ranked lower than some of the message packets remaining in the queue.

The priority manager monitors the status of all destination radios in the communications network or subnetwork and maintains the availability status of each radio in a database. The priority manager then selects the highest ranked destination radio from the radio queue 208 that is identified as available in the priority manager's database and transmits all message packets destined for the selected destination radio.

After each transmission, the priority manager 206 updates the message queue 205 to account for the remaining time to live for each message packet and re-ranks the order of the message packets remaining in the message queue 205, and re-ranks the destination radios remaining in the radio queue 208.

The priority manager eliminates the lost time in switching to a previously unavailable destination radio higher in the radio queue which becomes available after a radio lower in the queue has been selected to transmit. Once a destination radio has been selected, the messages for the selected radio are transmitted without regard to the availability status of the remaining radios in the radio queue. The decision not to abort the transmission to the lower ranked radio results in eliminating the lost time associated with switching from one available radio station to a higher ranked radio station which became available.

Figure 4:
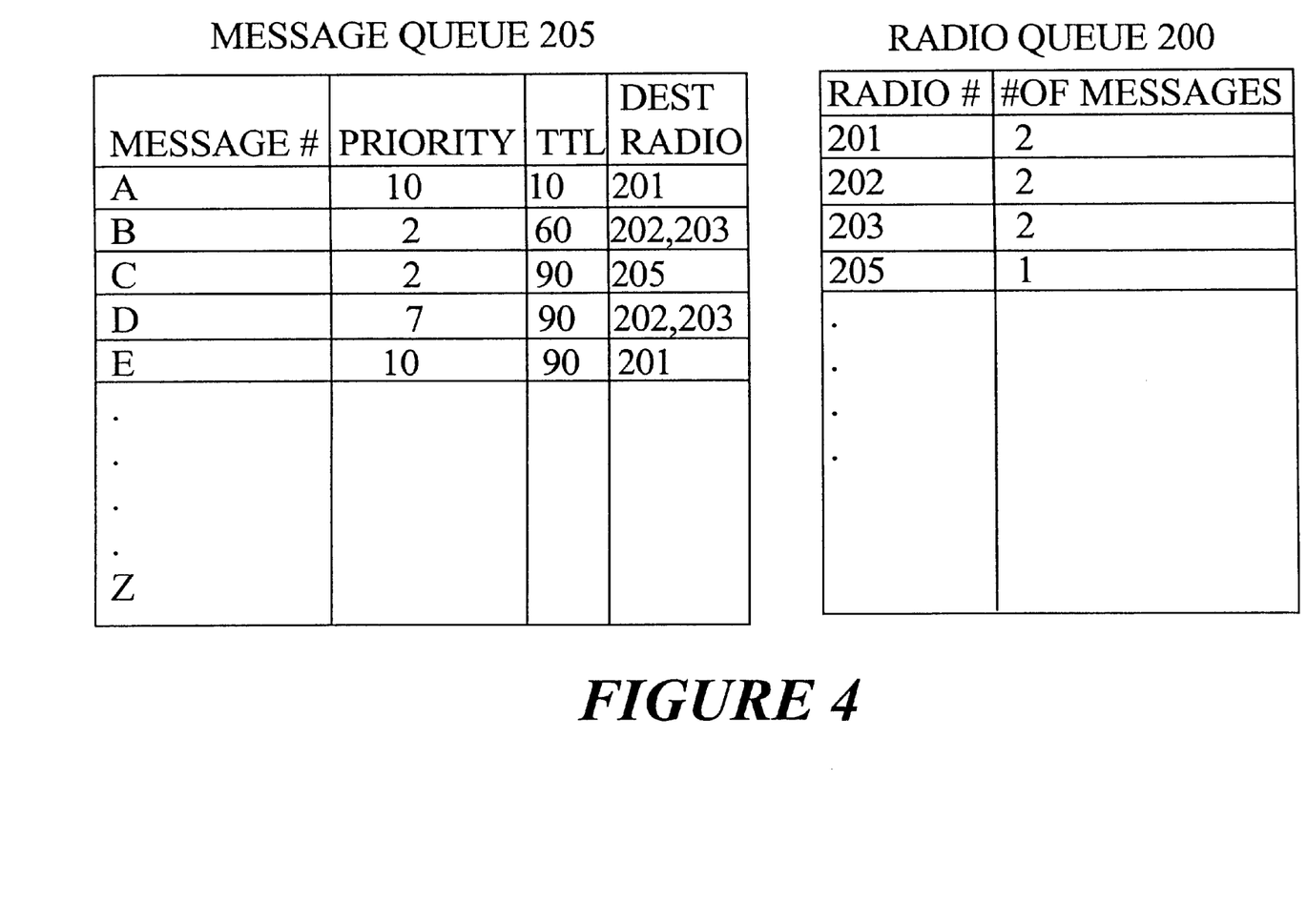
FIG. 4 is a pictorial representation of the message queue and radio queue of FIG. 2.

The operation of the priority manager 206 can be described with reference to FIGS. 3 and 4. The messages in the message queue 205 are maintained in order of urgency. As shown in FIG. 4, for example, message packet A is destined to radio 201, has a priority of 10 (high), a time to live of ten seconds and is ranked as having the highest urgency in the message queue 205. Message packet B is destined to radio 202 or 203, has a priority of 2 (low) and a time to live of 60 seconds, and is ranked second in urgency in the message queue 205. Message packet C is destined to radio 205, has a priority of 2, a time to live of ninety seconds and is ranked third in urgency. Message packet D is destined for radio 202 or 203, has a priority of 7, a time to live of ninety seconds and is ranked fourth in urgency. Message E is destined for radio 201, has a priority of 10, a time to live of ninety seconds and is ranked fifth in urgency.

The priority manager 206 maintains a list of the destination radios for message packets A–E in the radio queue 208. The radio queue 208 ranks the destination radios associated with messages A–E in the message queue 205 as a function of the urgency of the messages A–E. For example, radio 201 is the destination radio of message A and is therefore ranked first in the radio queue (even though message E also destined for radio 201 is ranked last). Radios 202 and 203 are the destination radios of Messages B and D and are ranked second and third in the queue. (In this example, the respective ranking of radios 202 and 203 is not material because both radios are associated with the second ranked message B). Radio 205 is the destination radio of Message C and is ranked fourth in the radio queue.

Priority manager 206 maintains a database of the availability status of radios 201, 202, 203 and 205. If priority manager determines that radio 203 is the highest ranked available radio, message packets B and D would be pulled from the message queue 205 and transmitted to radio 203 for delivery to their respective destination stations. Message queue 205 would then update and re-rank messages A, C and E remaining in the message queue 205 and update and re-rank the destination radios for messages A C, and E remaining in the radio queue 206.

The described radios have the capability of transmitting either voice or data, and thus the priority manager 206 of the present invention has the capability to ensure that voice messages are assigned a higher urgency, and thus are transmitted prior to, data messages. For example, any voice message received at the source radio from the source station can be assigned a high priority and a short time to live such that the determined urgency will be greater than any data message. Thus, the priority manager 206 can be programmed to always rank a voice message packet higher in the message queue 205 than a data packet.

The message queues and the radio queues are distributed throughout the radio network, i.e., each radio maintains its own queues, and therefore the priority manager in each radio can independently manages message transmission order and can take advantage of simultaneous transmissions utilizing conventional trunking methods resulting in increased message throughput in the communication network.

Conglomeration

Packet conglomeration is an important issue due to the bandwidth constraints and the half duplex nature of some wireless systems. In another embodiment of the present invention, a unique packet conglomeration method is used to reduce the number of transmissions required to transmit the message packets in the message queue. Reducing the number of transmissions generally results in reducing the bandwidth necessary and reduces the operating costs of the system.

Additionally, reducing the number of transmissions is of paramount importance in an environment vulnerable to electronic surveillance. The reduced number of transmissions contributes to a reduction in the electronic signature of the radio.

With Reference to FIG. 2, once the highest ranked available destination radio is determined by the priority manager 206, a conglomerated packet is formed. Message packets destined to the same radio are conglomerated by the packet conglomeration manager 207 into a single assembly.

In conventional conglomeration methods, conglomerated assemblies are formed as a function of the ultimate destination station of the message packets without regard to intermediate points such as destination radios. In contrast, the present invention determines intermediate transmission points in common between message packets, i.e., destination radios, to thereby permit message packets to be conglomerated even though they are not destined to the same ultimate destination station. This improved conglomeration method increases the number of message packets available for conglomeration into a single assembly.

For example, with reference to FIGS. 3 and 4, message A is addressed to station 120 and message E is addressed to station 130. Station 120 and Station 130 utilize the same destination radio 201. If radio 201 is the highest available destination radio, all messages destined for radio 201, messages A and E in this example, will be pulled from the message queue 205 by the priority manager 206 and sent to packet conglomerator 207. Packet conglomerator 207 will conglomerate Messages A and E using conventional conglomeration methods into a conglomerated assembly for transmission as a single entity to destination radio 201.

The conglomerated packets may be framed by adding appropriate headers, checksums and forward error correction coding using conventional techniques well known to those skilled in the communications art, and whose details are therefore not described in the present application.

The receiving radios will check for the destination subnet address of the conglomerated assembly and ignore the assembly if not targeted to itself. The destination radio may perform error correction and check sum validation using conventional methods. If the checksum validates, the payload data is reformatted into individual message packets and routed to the external data interface for delivery to the appropriate destination station and ports.

The present conglomeration manager has several advantages over the prior art. First, the message packets are conglomerated as a function of the destination radio, without regard to the ultimate station or port address. By conglomerating message packets on the basis of destination radio address, less transmissions are required than if the packets are conglomerated on the basis of station address or port address as is typically done in the prior art.

Second, the message packets for a destination radio are not conglomerated until it has been determined that the destination radio is available. By waiting until an available destination station has been identified, the most recently entered message packets in the message queue are considered for conglomeration and thus more data is available for conglomeration. This reduces the number of transmissions and thus the required bandwidth that may otherwise be necessary. Additionally, the conglomeration assembly includes the most recent message packets addressed to the destination radio.

Many conventional conglomeration managers conglomerate message packets before determining whether the destination radio or node is available. The conglomerated assembly then may sit idle while waiting for the destination radio or node to become available while messages that may have recently entered the message queue for the selected destination radio are not considered for conglomeration with the currently conglomerated assembly.

Compression

In another embodiment of the present invention, a unique compression method may be utilized after the message packets have been conglomerated. Compression, following conglomeration, may further reduce the number of transmissions required to deliver all the message packets in the message queue even further.

After the conglomerated assembly is formed, packet conglomeration manager 207 determines if compression of the conglomerated assembly is desirable. Packet conglomeration manager 207 compresses the conglomerated assembly and compares the size of the compressed assembly with the size of the uncompressed assembly. If the size of the compressed assembly is larger than the uncompressed assembly, then compression is undesirable and the conglomerated assembly will be transmitted without compression. Typically, files such as JPEG files and video streams result in larger files when compressed and therefore compression is not desirable.

The method of conglomerating the message packets only after it is determined that the destination station is available is beneficial to the compression efficiency of the present invention. As the amount of data being compressed increases, the compression efficiency of the compression method increases. As described earlier, the conglomeration method of the present invention tends to increase the message packets available for conglomeration and thus also available for compression which would therefore tend to increase the compression efficiency of the present method, further reducing the bandwidth that would have otherwise been necessary.

Packet conglomeration manager 207 may also encrypt the conglomerated message prior to transmission. Encryption may be accomplished using well known encryption technology, details of which are well known in the art and therefore not discussed in the present application. Such encryption methods may include symmetric key encryption and public key encryption.

Encryption is accomplished after compression because once data is encrypted, the randomize order of the data makes compression utilizing conventional compression techniques more difficult.

Thus, many message packets sent from one station to another are transferred as a single conglomerated assembly, rather than the usual single packet per transmission, avoiding significant bandwidth waste and greatly reducing the number of transmissions required to transmit the message packets.

The destination radio may also utilize an automatic detection method to determine if the received assembly is compressed. For example, if the transmitted assembly is not compressed, as discussed above, it is important for the destination radio to identify the assembly as uncompressed so that the uncompression algorithm resident in the destination radio can be skipped. One such method of determining whether the received assembly is compressed would be to check for a compression identifier located in the header of the assembly.

TCP Retransmission Filtering

In yet another embodiment of the present invention, a TCP filter is utilized to prevent the retransmission of successfully transmitted message packets.

In a conventional communication network, TCP may be used as the reliable transport protocol for acknowledging IP packets successfully received at a destination station. The TCP system will re-transmit all of the unacknowledged data that it has received if the source station does not receive a timely acknowledgment from a destination station as a means for guaranteed delivery. Prior art radio TCP systems will often unnecessarily re-send packets through radio networks because of inherent delays in receiving timely acknowledgments due to the half-duplex nature and low bandwidth of wireless communication.

In the present radio system, radio traffic is reduced by eliminating the unnecessary TCP re-send packets by reducing the time it takes the communication network to identify a message packet acknowledgment.

With reference to FIG. 3, a source radio 200 will maintain a message queue of all message packets received from the source station 100 for transmission to a destination station 130. As a conglomerated assembly is transmitted from the source radio 200, the assembly's message packets are removed from the message queue. When the destination station 130 receives a message packet targeted to it, the destination station 130 sends an acknowledgment message to the source station 100 acknowledging the receipt of the message packet. If the source station 100 does not receive the acknowledgment in a predetermined period of time, the source station 100 will send a TCP retransmission to the source radio 200. The retransmission will be stored in the message queue of the source radio 200 for retransmission to the destination station 130.

The radios of the present invention are capable of identifying received acknowledgment messages, thereby obviating the necessity of a proxy and avoiding the time delay associated with having to wait for the acknowledgment message to reach the source station.

In one embodiment of the present invention, unnecessary retransmissions are avoided through the use of "peeking" technology. A source radio "peeks" at received messages in order to identify an acknowledgment message received from a destination station. Once an acknowledgment message has been identified, the source radio can then compare the received acknowledgment message with the messages in the source radio's message queue to determine if a corresponding TCP retransmission message has been received from the source station. If the received acknowledgment message matches the a TCP retransmission message in the message queue of the source radio, the TCP retransmission message is removed from the message queue and discarded. Thus, the "peeking" technology of the present invention prevents the retransmission of messages, even though the acknowledgment message has not yet been received at the source station.

In order to determine if the acknowledgment message corresponds with the TCP retransmit message, TCP filter 204 in the source radio 200 may compare, the sequence number, destination address, source address, destination port, source port, and TCP control bits of the messages. In the alternative, any other message identifiers may be compared which would assist in the identification of a TCP retransmit message corresponding to the received acknowledgment message.

The operation of the TCP filter can be described with reference to FIG. 4. For example, message packet B is sent from a source station 100 through a source radio 200 for transmission to a destination radio 203 for delivery to a destination station 140. Station 100 will wait to receive a TCP acknowledgment message from destination station 140. If the acknowledgment message is not received at source station 100 after a predetermined period of time, source station 100 will send a TCP retransmit message for message packet B to source radio 200. Source radio 200 will store the TCP retransmit message in its queue for retransmission to destination radio 203, and may use the priority management, conglomeration and compression techniques described previously.

Source radio 200 will "peek" at all messages received from other radios and compare the received messages with the messages in its message queue 205 to determine if a received acknowledgment messages corresponds to a TCP retransmit message. For example, if destination radio 203 transmits a TCP acknowledgment message from station 140 to source radio 200 for delivery to source station 100, the source radio 200 will peek at the acknowledgment message, identify the acknowledgment message as corresponding to the TCP retransmit message in its message queue, and discard the TCP retransmit message.

If the source radio 200 does not receive a TCP acknowledgment message before it becomes time to transmit the TCP retransmit message, message packet B will be retransmitted to destination radio 203 for delivery to destination station 140.

Advantages and Scope of Invention

Accordingly, applicant's invention increases the message throughput or capacity of a communication system while conserving bandwidth and transmission time.

Applicant's priority manager considers not only the priority of the messages to be transmitted, but also the time to live of each message, whether the message is voice or data, and the availability of the destination radio to receive.

Applicant's conglomeration manager conglomerates packets destined to the same destination radio, without regard to the messages destination station thereby increasing the percentage of conglomeration.

Applicant's conglomeration manager also considers whether compression will reduce or increase the size of the conglomerated assembly, and will bypass the compression algorithm if sufficient reduction in bandwidth is not achieved.

Applicant's TCP filter reduces unnecessary retransmissions by reducing the delays associated with the recognition of an acknowledged packet.

While preferred embodiments of the present invention have been described, it is to be understood that the embodiments described are illustrative only and the scope of the invention is to be defined solely by the appended claims when accorded a full range of equivalence, many variations and modifications naturally occurring to those skilled in the art from a perusal hereof.

What is claimed is:

1. A method of increasing the message throughput in a radio network comprising the steps:
   a) providing a message queue of message packets ranked in an order of transmission at a source radio, each packet having a destination radio associated therewith;
   b) providing a radio queue of destination radios associated with the message packets in the message queue ranked in order as a function of the ranking of the messages in the message queue;
   c) monitoring all other radios in the radio network at a source radio to determine the availability of each radio to receive a transmission;
   d) selecting the highest ranked available destination radio from the radio address queue;
   e) selecting the messages in the message queue corresponding to the selected destination radio; and
   f) transmitting the selected messages,
   to thereby allow a message packet ranked lower in the message queue to be transmitted before a message packet ranked higher in the message queue if the destination station associated with the higher ranked message is unavailable.

2. The method of claim 1 wherein the step of selecting the messages further includes the steps of conglomerating the selected messages into a conglomerated assembly.

3. The method of claim 2 wherein the step of conglomerating further includes the step of compressing the conglomerated assembly.

4. The method of claim 1 wherein steps c)–f) are repeated until all messages have been transmitted.

5. The method of claim 1 wherein the step of monitoring includes the step of maintaining a database of the availability status of each of the radios in the network.

6. The method of claim 1 wherein each message packet has an associated time to live and priority and the step of providing a queue comprises the step of ordering the message packets in the queue as a function of the time to live and urgency of the message packets.

7. The method of claim 1 wherein steps a)–f) are distributed over the radio network such that each radio of the network is capable of performing steps a)–f).

8. A method of transmitting message packets in a radio network in which each message packet has an associated destination radio comprising the steps of:
   a) maintaining a message queue of messages ranked in an order of transmission;
   b) maintaining a radio queue of destination radios ranked in the order transmission corresponding to the message packets in the message queue;
   c) monitoring the radios in the network to determine the availability of each radio to receive a message;

d) transmitting the messages in the message queue as a function of the availability of the destination radios in the radio queue.

9. The method of claim 8 wherein the ranked order of the message queue is a function of the time to live and priority associated with each message packet.

10. The method of claim 9 wherein the step of maintaining a radio queue includes the step of ranking the order of the radio addresses as a function of the ranking of the corresponding message packet in the message queue.

11. A system for increasing the message throughput in a radio network comprising:

a message queue comprising message packets ranked in an order for delivery to destination radios;

a radio queue comprising destination radios corresponding to the messages in the message queue the destination radios ranked as a function of the ranking of the messages in the message queue;

means for monitoring the availability of the destination radios in the radio queue;

means for selecting an available destination radio from the radio queue;

means for selecting the messages in the message queue addressed to the selected destination station; and means for transmitting the selected messages to the selected destination station, wherein the messages are transmitted as a function of the highest ranked available destination radio.

12. The system of claim 11 wherein the means for transmitting includes means for conglomerating the selected messages into a conglomerated assembly.

13. The system of claim 12 wherein the means for conglomerating includes means for compressing the conglomerated assembly.

14. The system of claim 11 wherein the message queue includes means for ranking the messages in the order of transmission.

15. The system of claim 11 wherein the means for monitoring includes a database containing the availability status of the destination radios.

* * * * *